United States Patent
Steer et al.

(10) Patent No.: US 9,854,462 B2
(45) Date of Patent: *Dec. 26, 2017

(54) SURVIVABLE MOBILE NETWORK SYSTEM

(71) Applicant: BlackBerry Limited, Waterloo (CA)

(72) Inventors: David Gwyn Steer, Nepean (CA); Robert Novak, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 68 days.

This patent is subject to a terminal disclaimer.

(21) Appl. No.: 14/742,214

(22) Filed: Jun. 17, 2015

(65) Prior Publication Data

US 2015/0319593 A1    Nov. 5, 2015

Related U.S. Application Data

(63) Continuation of application No. 13/643,235, filed as application No. PCT/CA2010/000645 on Apr. 30, 2010, now Pat. No. 9,071,987.

(51) Int. Cl.
| | |
|---|---|
| *H04J 1/16* | (2006.01) |
| *H04W 24/04* | (2009.01) |
| *H04W 8/02* | (2009.01) |
| *H04W 4/22* | (2009.01) |
| *H04W 76/00* | (2009.01) |
| *H04W 24/08* | (2009.01) |

(Continued)

(52) U.S. Cl.
CPC ......... *H04W 24/04* (2013.01); *H04W 4/22* (2013.01); *H04W 8/02* (2013.01); *H04W 76/007* (2013.01); *H04W 12/06* (2013.01); *H04W 24/08* (2013.01); *H04W 76/028* (2013.01)

(58) Field of Classification Search
None
See application file for complete search history.

(56) References Cited

U.S. PATENT DOCUMENTS

| 7,872,974 B2 | 1/2011 | Ujjain et al. |
| 8,339,970 B2 | 12/2012 | Tailor |

(Continued)

FOREIGN PATENT DOCUMENTS

| CN | 101035075 A | 9/2007 |
| CN | 101083606 A | 12/2007 |

OTHER PUBLICATIONS

Office Action dated Aug. 22, 2014; U.S. Appl. No. 13/643,235, filed Oct. 24, 2012; 23 pages.

(Continued)

*Primary Examiner* — Kibrom T Hailu
(74) *Attorney, Agent, or Firm* — Conley Rose, P.C.; J. Robert Brown, Jr.; Albert A. Abbou

(57) ABSTRACT

A method of establishing communication links during a failure within a mobile communications network includes detecting disruptions in communications between a plurality of base stations and a plurality of mobile terminals. Survivability components are activated within the base station and the mobile terminal to operate in a survivability mode. The survivability mode enables communications and services to be provided by the surviving base stations to mobile terminals through activated survivability components. The alternate communication links may operate for as long as a disruption exists.

18 Claims, 9 Drawing Sheets

(51) Int. Cl.
*H04W 76/02* (2009.01)
*H04W 12/06* (2009.01)

(56) References Cited

U.S. PATENT DOCUMENTS

| | | | |
|---|---|---|---|
| 8,458,295 B1* | 6/2013 | Crowell | H04L 67/1097 |
| | | | 707/674 |
| 8,536,998 B1 | 9/2013 | Siu et al. | |
| 9,071,987 B2 | 6/2015 | Steer et al. | |
| 2004/0049532 A1* | 3/2004 | Oka | H04W 4/16 |
| | | | 709/202 |
| 2004/0081086 A1 | 4/2004 | Hippelainen et al. | |
| 2005/0031058 A1* | 2/2005 | Soong | H03G 3/3052 |
| | | | 375/345 |
| 2005/0195859 A1 | 9/2005 | Mahany | |
| 2006/0052096 A1 | 3/2006 | Dolgov et al. | |
| 2006/0223493 A1* | 10/2006 | Freund | H04W 24/04 |
| | | | 455/404.2 |
| 2007/0047571 A1* | 3/2007 | Kandikonda | H04L 29/06027 |
| | | | 370/449 |
| 2007/0053359 A1* | 3/2007 | Wu | H04J 3/14 |
| | | | 370/392 |
| 2007/0178929 A1* | 8/2007 | Kim | H04W 52/228 |
| | | | 455/522 |
| 2009/0147702 A1 | 6/2009 | Buddhikot et al. | |
| 2009/0157371 A1* | 6/2009 | Conway | H04L 41/06 |
| | | | 703/13 |
| 2009/0254970 A1* | 10/2009 | Agarwal | H04L 63/1425 |
| | | | 726/1 |
| 2010/0067476 A1 | 3/2010 | Periyalwar et al. | |
| 2010/0097928 A1* | 4/2010 | Ramakrishnan | H04L 41/12 |
| | | | 370/221 |
| 2010/0182954 A1* | 7/2010 | Ulrich | H04W 16/32 |
| | | | 370/328 |
| 2011/0165898 A1* | 7/2011 | Drevon | H04W 4/12 |
| | | | 455/466 |
| 2011/0243051 A1* | 10/2011 | Kenchareddy | H04W 36/18 |
| | | | 370/312 |

OTHER PUBLICATIONS

Final Office Action dated Dec. 1, 2014; U.S. Appl. No. 13/643,235, filed Oct. 24, 2012; 18 pages.
Advisory Action dated Feb. 5, 2015; U.S. Appl. No. 13/643,235, filed Oct. 24, 2012; 3 pages.
Notice of Allowance dated Feb. 24, 2015; U.S. Appl. No. 13/643,235, filed Oct. 24, 2012; 13 pages.
PCT International Search Report; Application No. PCT/CA2010/000645; dated Jul. 27, 2010; 3 pages.
PCT Written Opinion of the International Searching Authority; Application No. PCT/CA2010/000645; dated Jul. 27, 2010; 4 pages.
Canadian Office Action; Application No. 2,793,699; dated Jul. 21, 2014; 2 pages.
Canadian Office Action; Application No. 2,793,699; dated May 12, 2015; 4 pages.
Chinese Office Action; Application No. 201080066522.1; dated Sep. 28, 2014; 27 pages.
Chinese Office Action; Application No. 201080066522.1; dated Jun. 12, 2015; 25 pages.
European Extended Search Report; Application No. 10850425.9; dated May 22, 2017; 9 pages.

* cited by examiner

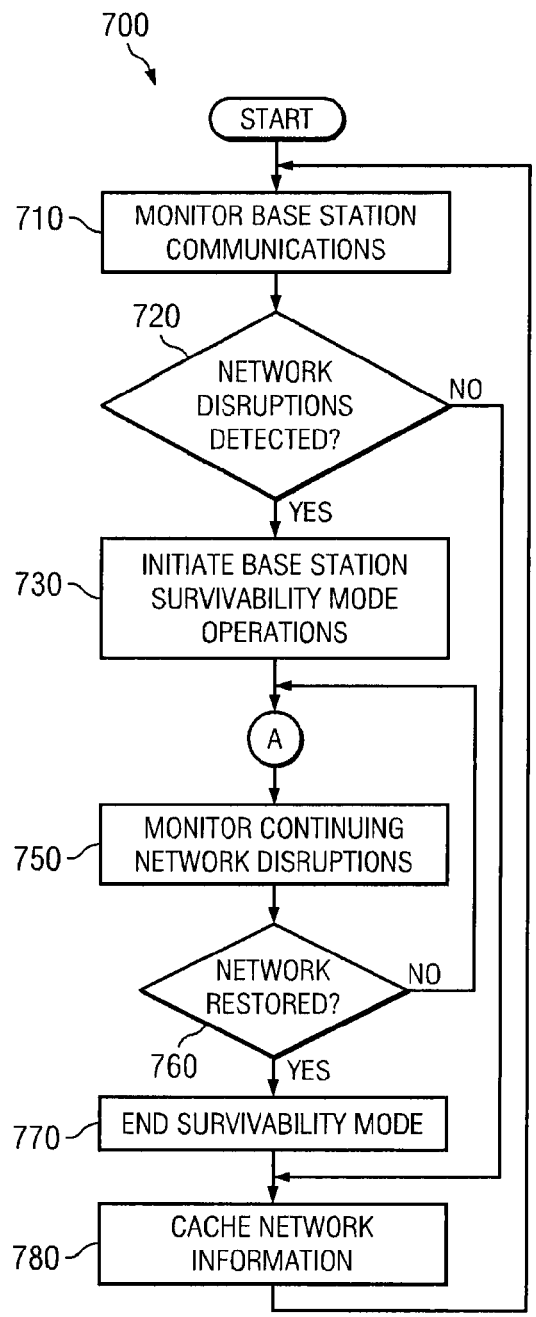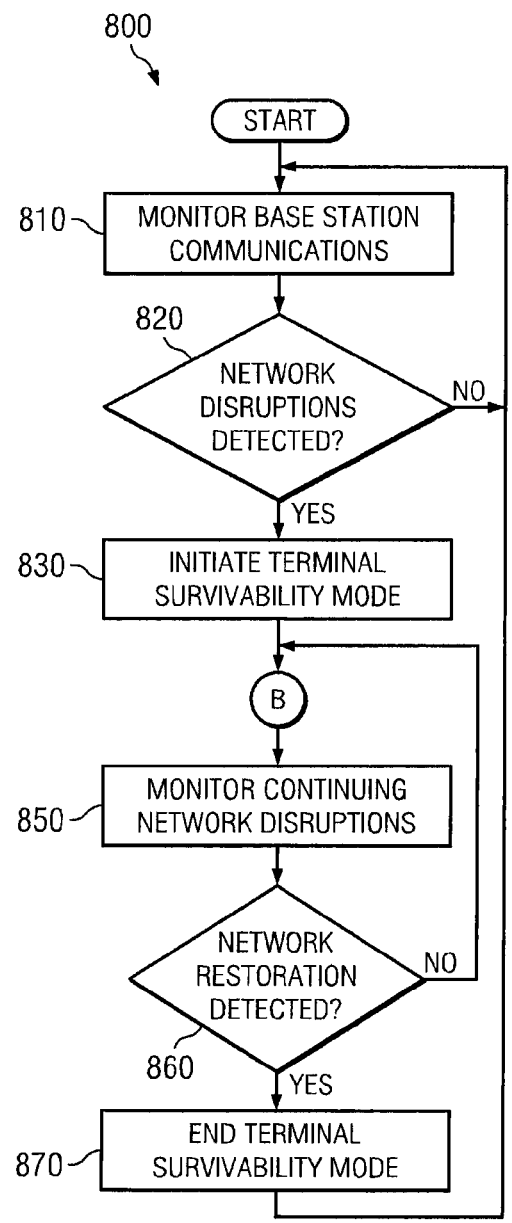
FIG. 7A
FIG. 8A

SURVIVABLE MOBILE NETWORK SYSTEM

CROSS-REFERENCE TO RELATED APPLICATIONS

This application is a continuation of U.S. patent application Ser. No. 13/643,235 filed Oct. 24, 2012 by David G. Steer, et al. entitled, "Survivable Mobile Network System" which is a National Stage Application of International Application No. PCT/CA2010/000645, entitled "Survivable Mobile Network System", filed on Apr. 30, 2010, both of which are incorporated herein by reference as if reproduced in their entirety.

BACKGROUND

1. Technical Field

This disclosure relates to management of a wireless communications network, and more specifically, to a system of maintaining communications within a network during network communication failures.

2. Description of the Related Art

Wireless communication networks are vulnerable to disruption and loss of service due to disasters or other catastrophic failures. The disasters may include, without limitation, natural disasters such as floods, earthquakes, tornadoes, and tsunamis, or a combination of such events. The catastrophic failures may include, for example, without limitation, destruction of base stations, communication links, communication networks, network services or a combination of such events.

In a disaster, it is urgent that emergency services be provided to the affected communities or areas as quickly as possible. Network or communication failures negatively impact the ability of an effective and immediate emergency response. For example, although emergency response personnel, such as, without limitation, police, fire fighters, military, or rescue workers, may have global terminals or other cellular mobile devices, communication may be impossible because of a communication disruption or destruction of sections of the communications and services network.

BRIEF DESCRIPTION OF THE DRAWINGS

For a better understanding of the disclosure and the various embodiments described herein, reference is now made to the following brief description, taken in connection with the accompanying drawings and detail description, which show at least one exemplary embodiment.

FIG. 7 including partial views FIG. 7A

FIG. 8 including partial views FIG. 8A

DETAILED DESCRIPTION

Figure 1:
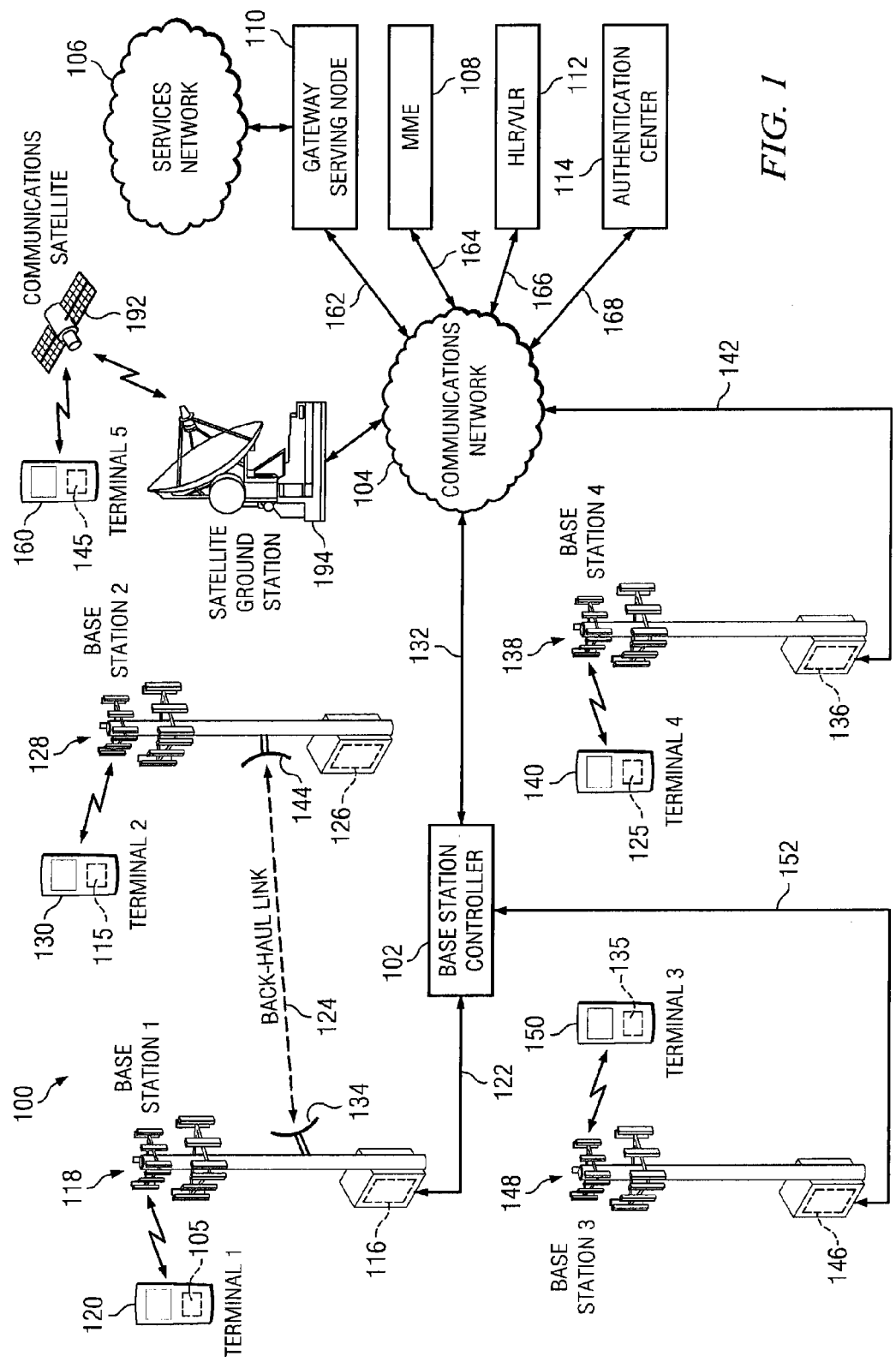
FIG. 1 illustrates a wireless mobile communication network in which illustrative embodiments of the disclosure may operate.

It should be understood at the outset that although an illustrative implementation of one or more embodiments are provided below, the description is not to be considered as limiting the scope of the embodiments described herein. The disclosure should in no way be limited to the illustrative implementations, drawings, and techniques illustrated and described herein, which may be modified within the scope of the appended claims along with a full scope of equivalence. It should be appreciated that for simplicity and clarity of illustration, where considered appropriate, the reference numerals may be repeated among the figures in the corresponding or analogous elements.

According to an illustrative embodiment, a system of base stations and mobile terminals distributed within a communications network is disclosed. The system comprises a number of survivability components operatively monitoring communications within the communications network. The survivability components are located with at least one base station and a number of the survivability components perform functions of corresponding components within the communications network.

In accordance with another embodiment of the disclosure, a base station of a communications network comprises survivability components that maintain operation of the base station during a failure of the communications network, wherein a number of the survivability components correspond to components within the communications network that perform a same function.

In accordance with a further embodiment of the disclosure, a mobile terminal of a communications network comprises a plurality of applications which, when executed by a processor, maintain operations in a survivability mode activated by a mobile terminal during a disruption of communications within the communications network.

In accordance with another embodiment of the disclosure, a method of operating a base station comprises determining, by a detector, an existence of a communications failure, and responsive to determining the existence of the communications failure, activating, by an operations controller, operations of survivability components in a number of base stations within a communication network.

The present disclosure provides a wireless network survival apparatus that enable a wireless communication network to maintain functional operations even if the network is destroyed or disrupted. The wireless network survival apparatus includes components that are implemented in a mobile terminal or cellular device and base stations. The wireless network survival components, referred to herein as survivability components, may be integrated or designed into a mobile terminal and base station and may interact with existing hardware and software features of the mobile terminal and base station.

In embodiments of the disclosure, the designation "S-" indicates that a component is a survivability component. Additionally, as used herein, terminology such as "surviving", "survivability", "survival" with respect to telecommunications and network means the ability to operate or continue operations despite disruptions or failures in network services or communications.

The wireless network survival components may be hardware elements, software applications, or a combination of hardware and software elements. In the event of an emergency, such as a network services or communications disruption, the survivability components of the existing mobile terminals and base stations within the wireless communication network are activated to allow the continuation of wireless communications, such as, without limitation, the transmission and reception of radio frequency signals and messages.

Turning first to FIG. 1, a mobile wireless communications network 100 in which an illustrative embodiment of the disclosure may operate is depicted. In these depicted examples, the number of base stations and mobile terminals illustrated in mobile wireless communications network 100 are merely exemplary and is not limited to the number illustrated. The mobile terminals may include wireless devices, such as, without limitation, a mobile phone, a smart phone, a laptop computer, a personal digital assistant or other such wireless mobile device as may be known to one skilled in the art.

In wireless network 100, a plurality of base stations in communications network 100 connect to base station controller 102 through a wired or wireless connection. In the illustrative embodiment, base station 1 118 and base station 3 148 are connected to base station controller 102 by wired connections 122 and 152, respectively. Wired connections include, but are not limited to, wire cables, fiber cables, or other wired means known to one skilled in the art. In an embodiment, the connections to base station controller 102 may also be wireless. Base stations may also be operatively coupled to communications networks, such as communications network 104 through wired or wireless means. For example, base station 4 138 may communicate through a wired connection 142 to communications network 104.

Base stations within the mobile wireless communications network 100 may also be connected to each other or to the network through a wireless point-to-point transmission link, such as back-haul link 124, created between radio links positioned on base stations, such as radio link 134 and radio link 144. A back-haul link is a point-to-point radio link between base stations that enables a first base station to communicate with a second base station or other nodes within the network. In the depicted example, base station 2 128 communicates through back-haul transmission link 124 to base station 1 118. In an embodiment, base station controller 102 may be located within a base station of a network, such as base station 1 118, base station 2 128, base station 3 148, and base station 4 138.

Mobile wireless communications network 100 may also include satellite ground stations, such as satellite ground station 194 that provide radio frequency transmissions to mobile terminals of the network. In an illustrative embodiment, satellite ground station 194 may transmit and receive transmissions from communications network 104. Satellite ground station 194 may send and receive transmissions from a number of terminals, such as terminal 5 140, through a communications satellite 192. As used within this disclosure, "a number of" refers to one or more items.

Mobile wireless communications network 100 includes a number of network components that are operably coupled to the plurality base stations to enable operation of the mobile services network. For example, the network components may include, without limitation, a mobility management entity (MME) 108, a home location register (HLR) and visitor location register (VLR) 112, an authentication center 114, and a gateway serving node 110. Each network component may be connected to a communications network 104, and a services network 106.

In an illustrative embodiment, initial communications may be established between a base station such as base station 1 118 and a mobile terminal such as terminal 1 120. Base station 118 communicates with the network components through base station controller 102 to enable mobile terminal 1 120 to access communications network 104 and services network 106. For example, base station controller 102 may enable terminal 1 120 and terminal 3 150 to receive and send communications over communications network 104 to network components, such as, mobility management entity (MME) 108, the visitor location register and home location register 112, the authentication center 114, and the gateway serving node 110. Communications network 104 may communicate to the network components over channels or links, for example, without limitation channel 162, 164, 166, and 168, respectively.

For example, the HLR/VLR 112 and the authentication center 114 will identify each mobile terminal within the network and verify the services and capabilities of the mobile terminal. Base station controller 102 may supervise or control a number of base stations within mobile wireless communications network 100, such as, without limitation, base station 1 118, base station 2 128, and base station 3 148 and enable the base stations to connect to the network components, such as, without limitation, authentication center 114, HLR/VLR 112, mobility management entity 108, and the services network 106 through communications network 104.

In illustrative embodiments, the base stations and mobile terminals of wireless communications network 100 include survivability components that duplicate or perform operations or functions that are similar to the functionality of the network components that correspond to the survivability components. For example, base station 1 118 includes survivability components 116, base station 2 128, includes survivability components 126, base station 3 148 includes survivability components 146, and base station 4 138 include survivability components 136.

Similarly, in illustrative embodiments, the mobile terminals of the wireless communications network 100 include survivability components that may be activated in conjunction or along with the survivability components of the base stations. For example, mobile terminal 1 includes survivability component 105, mobile terminal 2 130 includes survivability component 115, mobile terminal 3 150 includes survivability component 135, mobile terminal 4 140 includes survivability component 125, and mobile terminal 5 160 includes survivability component 145.

The survivability components of the base station include corresponding or duplicate network components in wireless communications network 100. The survivability components are capable of performing the function of the network components in the wireless communications network 100, such as, without limitation, the mobility management entity 108, the home location register and visitor location register (VLR/HLR) 112, the authentication center 114, and the gateway serving node 110.

The corresponding survivability components within each base station monitor the functions of the network components during normal operation and record and store information on the operation and operating status of the network components in wireless communications network 100. The mobile terminals also include survivability components that include software applications and sensing apparatus.

Figure 2:
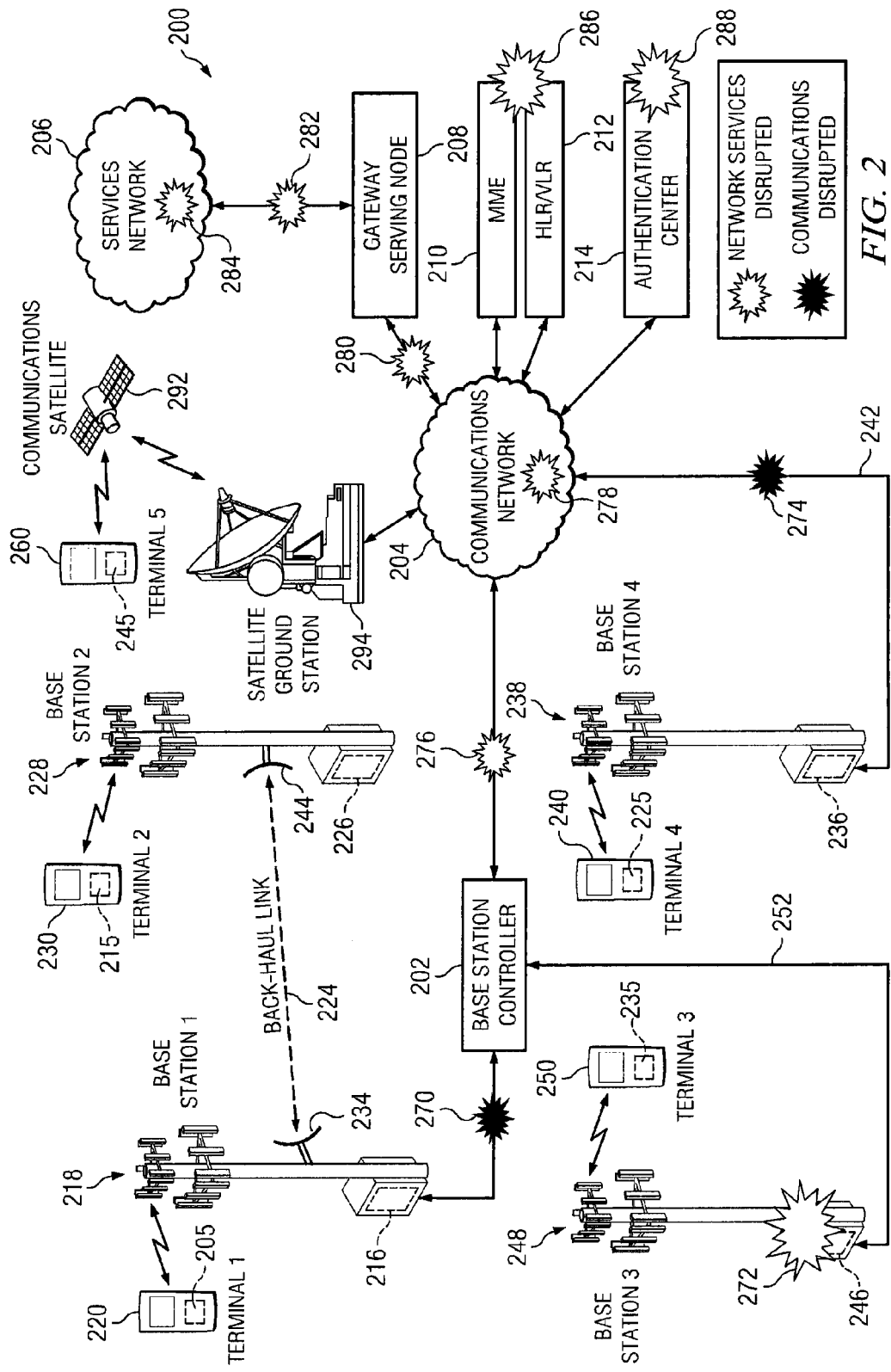
FIG. 2 illustrates a disrupted wireless communications network in which illustrative embodiments of the disclosure may operate.

Turning now to FIG. 2, a disrupted wireless communications network in which embodiments of the disclosure may operate is illustrated. In FIG. 2, the wireless communications network 100 of FIG. 1 is illustrated as being disrupted according to an embodiment of the disclosure. In this illustrative example, mobile wireless communications network 200 may have communication disruptions, network services disruptions, or a combination of networks services disruption and communication disruptions.

In other embodiments, connections between components may be disrupted, or the component itself may be disrupted. In these depicted examples of a mobile wireless communications network, such as mobile wireless communications network 200, network services disruption and communications disruptions that prevent communications may exist at various points within the network. The network services disruption and communication disruptions negatively impact the external communications of base stations, components, and networks and prevent communication among mobile terminals and base stations.

The disruptions of service within mobile wireless communications network may include disruptions that affect network services, such as, without limitation, disruptions 272 to base station 246, disruption 278 within a communications network 204, disruption 284 of a services network 206, disruption 280 between gateway serving node 208 and communications network 204, and disruption 282 between gateway serving node 208 and services network 206. In the illustrative embodiment, a base station or base station component may be affected by a disruption, such as disruption 272 to base station 246, even though a communication channel or link to the base station from an existing base station controller, such as communication channel 252 to base station controller 202, remains unaffected, communication channel or link may Disruptions may also occur between connections to the base station controller, such as, network disruption 276. Network services disruptions may also include disruptions to network components, such as disruption 286 to network component mobility management entity, MME 210, and disruption 288 network components Home Location Register/Visitor Location Register, HLR/VLR 212.

The disruptions of service within mobile wireless communications network 200 may also include disruptions that affect communications or radio frequency transmissions. The communication disruptions within a network may include, for example, without limitation, communication disruption 270 between base station controller 202 and base station 1 218, and communication disruption 274 on a communication channel or link 242 between communications network 204 and base station 4 238.

In this illustrative example, each base station included survivability components that incorporate the capabilities and functions that may exist in the network components of wireless communications network 200. In the illustrative embodiment, for example, base station 1 218, base station 2 228, base station 3 248, and base station 4 238, may include a subset of the functions provided by the mobility management entity (MME) 210, the visitor/home location registers (VLR/HLR) 212, the authentication center 214, and the gateway serving node 208.

The survivability components within the base stations, such as survivability components 216 in base station 1 218, survivability components 226 in base station 2 228, survivability components 246 in base station 3 248, and survivability components 236 in base station 4 238, are configured to monitor the operations of the network components during normal operations of the wireless communications network 200.

Disruptions to network services or communications in mobile wireless communications network 200 may result in a number of areas in the wireless communications network and a number of network components becoming disabled or non-functional. A communication or network disruption within the wireless communications network activates survivability components within surviving base stations, such as, survivability components 216 in base station 1 218, survivability components 226 in base station 2 228, and survivability components 236 in base station 4 238 to establish or reestablish communications.

The mobile terminals 220, 230, 240, 250, and 260 include survivability components 205, 215, 225, 235, and 245, respectively that are configured to activate when the communications network is disrupted. The survivability components may be implemented as software applications, firmware, hardware, or a combination of hardware and software applications.

In the illustrative examples, the survivability components 205, 215, 225, 235, and 245 of mobile terminals 220, 230, 240, 250, and 260 may be activated by a base station, such as base station 218, 228, 238, and 248 in mobile wireless communications network 200. Alternatively, mobile terminals 220, 230, 240, 250, and 260 may be configured to detect disruptions within the network without any indication from a base station.

The illustrations of FIG. 1 and FIG. 2 are not meant to imply physical or architectural limitations to the manner in which different embodiments may be implemented. Other components in addition to or in place of the components illustrated may be implemented in a specific communications network. Additionally, some components may be unnecessary in some embodiments. For example, some communication networks may include a plurality of base stations and a plurality of mobile terminals. Other communications networks may include a single base station. Other communication network may not include mobile terminals. Additionally, in other illustrative embodiments, for example, satellite ground station 294 and communications satellite 292 may not be included.

Figure 3:
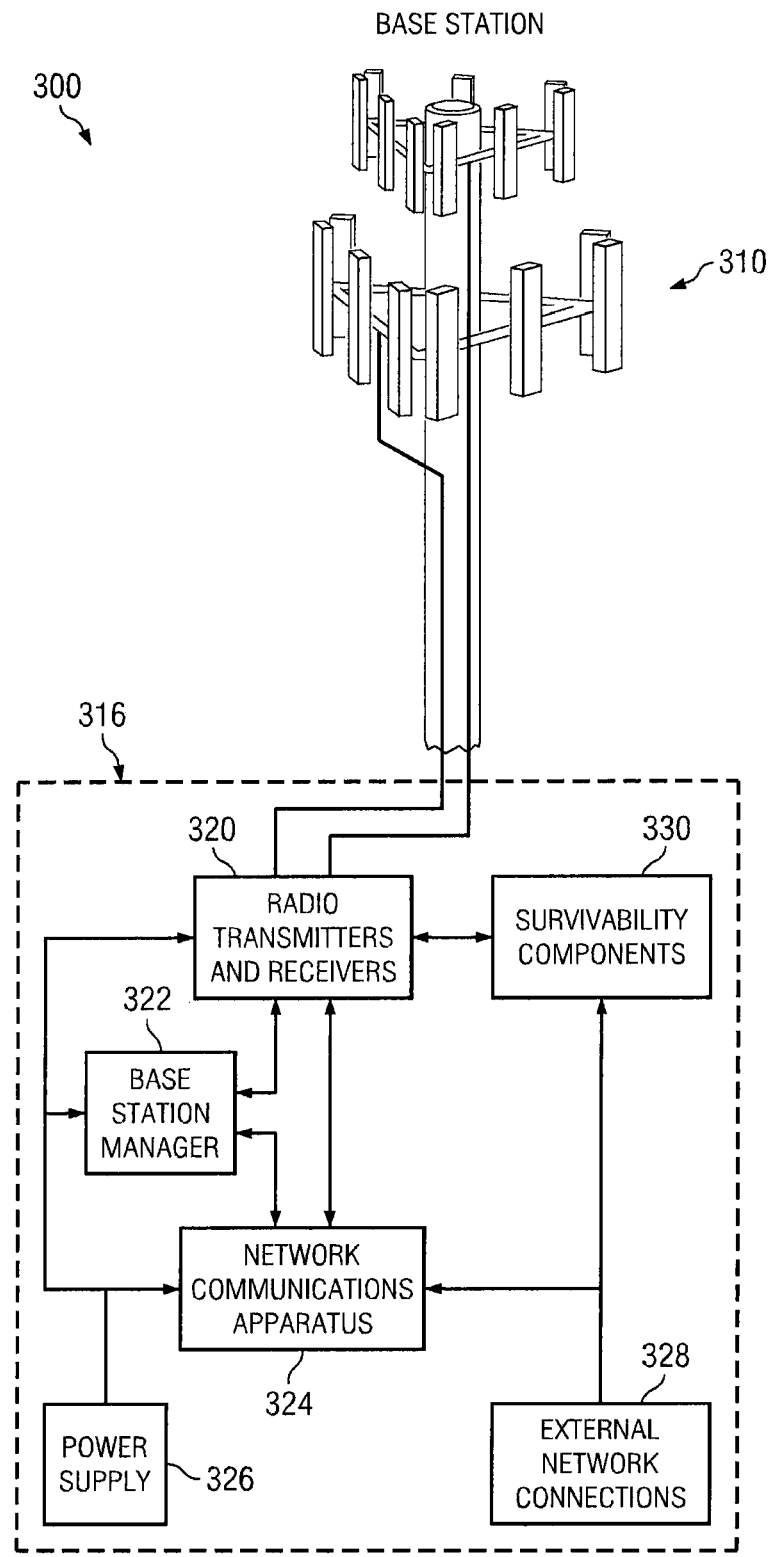
FIG. 3 illustrates a detailed diagram of a base station according to an illustrative embodiment of the disclosure.

Turning now to FIG. 3, a detailed diagram of a base station is shown according to an illustrative embodiment of the disclosure. In FIG. 3, the functionality of the network components required to continue communication within a disrupted communications network, such as network 200 in FIG. 2, is illustrated.

In diagram 300, base station 310 includes a plurality of communication components 316 that enable base station 310 to accept, process, and deliver communications within a wireless communications network such as wireless communications network 100 of FIG. 1.

The communication components 316 may include, without limitation, radio receivers and transmitters 320, network communications apparatus 324, base station manager 322, power supply, 326 and external network connections 328. Radio transmitters and receivers 320 send and receive radio signals, amplify them, and control the operation of the radio signals based on the protocol of the terminals in a particular network.

Radio transmitters and receivers 320 and network communications apparatus 324 are coupled to a base station manager 322. Base station manager 322 supervises the operation of base station 310 including the radio transmitters and receivers 320 and the network communications apparatus 324. A local power network may become unavailable in the event of a disruption such as a network services disruption or communications disruption as depicted in FIG. 2.

Power supply 326 provides power to operate base station 310. Power supply 326 is configured to provide power to base station 310 from a local power network (not shown) when available. Power supply 326 may continue to provide power to base station 310 using a battery, a generator set, a renewable power station, or a combination of these power sources, when a local power network is not available. External network connections 328 of base station 310 allow the base station 310 to interface with external devices.

The communication components 316 also include survivability mode components 330. During the normal operation of base station 310, survivability mode components 330 monitors or shadows the operation of the corresponding components in the wireless communications network 200 and store information about the processing of the components, the operation of the components, and the status of the components.

In the event of a disruption, such as a communications disruption or network services disruption as depicted in FIG. 2, the information stored in the survivability components 330 is enabled or activated to maintain communications activity and services within the coverage area of the surviving base station. In embodiments of this disclosure, a surviving base station is a base station that is operative to receive and transmit radio waves during emergencies or after a communication disruption has occurred.

Figure 4:
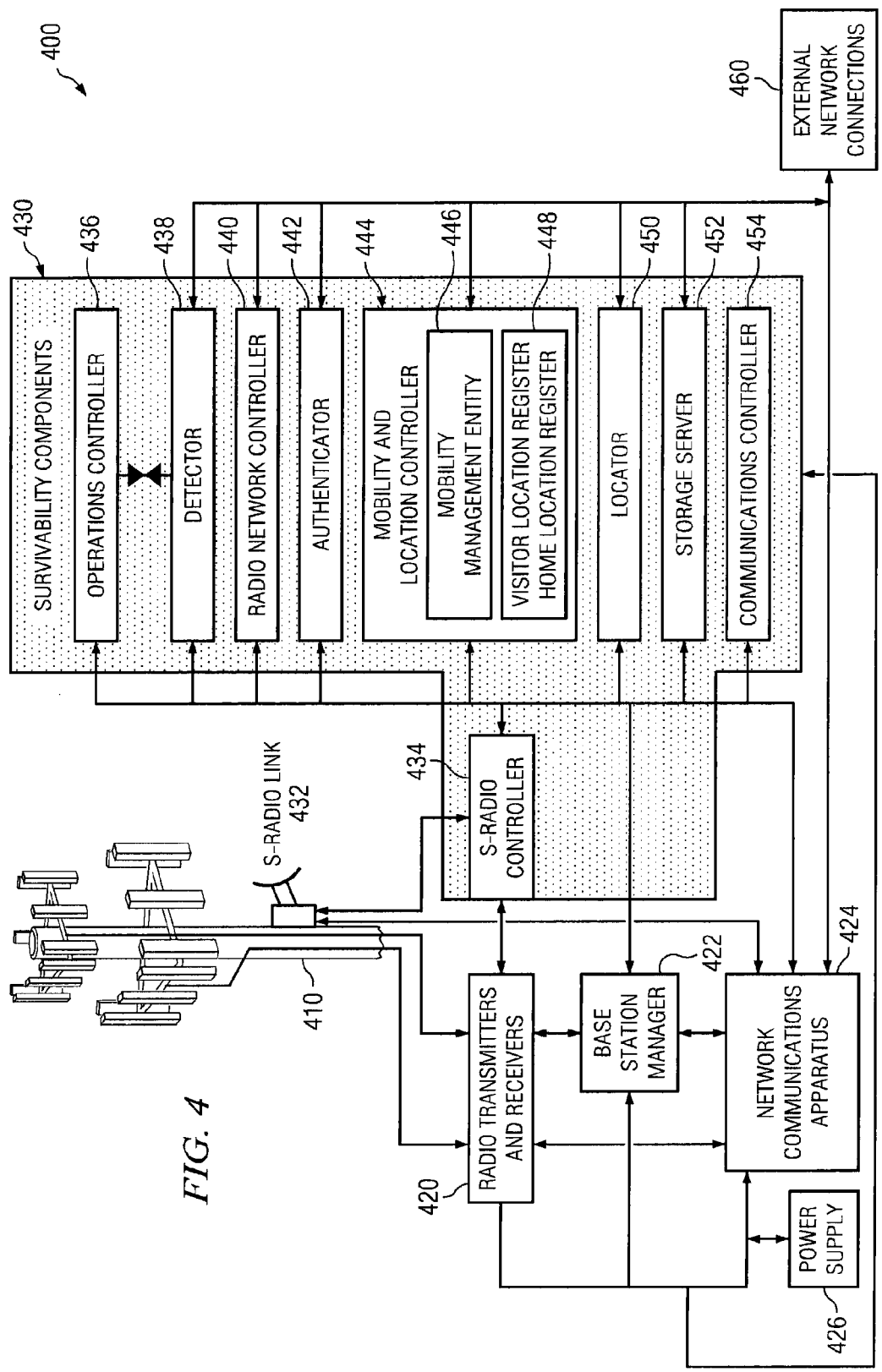
FIG. 4 illustrates a detailed block diagram of the survivability mode components of the base station illustrated in FIG. 3 according to an illustrative embodiment of the disclosure.

Turning now to FIG. 4, a detailed block diagram 400 of the survivability mode components of a base station 410 according to an illustrative embodiment of the disclosure is depicted. The survivability components 430 of base station 410 may feature components included in survivability components 330 of FIG. 3.

Base station 410 includes communications components comprising radio transmitters and receivers 420 and network communications apparatus 424 that are coupled to a base station manager 422. Base station manager 422 supervises the operation of base station 410 including the radio transmitters and receivers 420 and the network communications apparatus 424.

Power supply 426 provides power to operate of base station 410 in cases where a local power network becomes unavailable in the event of a disruption, such as a network services disruption or communications disruption as depicted in FIG. 2.

Survivability components 430 are configured to work within the base station. In these depicted examples, survivability components 430 are listed as individual elements. However, survivability components 430 may also be implemented as software processes cooperating within a processor of a base station manager, such as base station manager 422.

During the normal operation base station 410, the survivability mode components 430 shadow or record functions in the corresponding network elements and store information about their process, operation, and status. Detector 438 monitors external network connections 460 and the communication activities of mobile terminals within a communications network to determine whether a disruption exists within the communications network, such as communications network 100 of FIG. 1 and communications network 200 of FIG. 2. Detector 438 may detect a disruption of the communications network from information received on, for example, without limitation, the failure of a communications link to external network connections 460, disruptions within the communications network provided by mobile terminals or an operations failure by the base station manager 422.

The detection of a disruption by detector 438 enables detector 438 to activate or enable operations of the base station in a survivability mode to facilitate continued communication operations with local mobile terminals, surviving base stations and surviving network components within the communications network.

In survivability mode, detector 438 activates operations controller 436. Operations controller 436 implements processes to manage the continued operation of a base station in survivability mode. In survivability mode, operations controller may operate with base station manager 422 to operate base station 400. Base station manager 422 supervises the operation of base station 400 including the radio transmitters and receivers 420 connected to antennas within the antenna tower of base station 410.

Detector 438 enables operations controller 436 to operate base station manager 422 and survivability components 430 in an active or survivability mode. Detector 438 is also operative to restore normal base station operations and place the survivability components 430 in a monitoring or passive mode.

S-Radio link 432 may be activated in a survivability mode to enable communication traffic between other operational or surviving base stations or nodes in surviving networks. S-radio link 432 may include signaling and traffic channels. Detector 438 and operations controller 436 activate S-Radio link 432 to enable network services and communications to be provided across and within network areas of base stations. S-Radio link 432 may use the same communication channels as mobile terminals to enable a base station to communicate with other base stations in a manner similar to mobile-to-mobile terminal communications. For example, a base station with an S-Radio link 432 is enabled to receive and transmit radio frequency signals from another base station.

Radio network controller 440 may be activated or enabled by operations controller 436 and detector 438 operating in survivability mode. Radio network controller 440 operates with mobility and location controller 444 to manage the connections of mobile terminals within a base station coverage area. Radio network controller 440 operations may include supervising the transfer of communications between surviving base stations as a mobile station moves or transitions between coverage areas from a first surviving base station within a first coverage area of radio network controller 440 and a second surviving base station within a second coverage area of radio network controller 440.

Radio network controller 440 may also provide warnings or alerts to mobile terminals as a mobile terminal moves or transitions to the limit or edge of a base station coverage area that is supervised by radio network controller 440. The warnings may be formatted as, for example, without limitation, pre-recorded speech announcement, re-order tones, or text messages.

Radio network controller 440 together or in cooperation with mobility management entity 446 contain resources and processes to permit the planning and routing of call and communications traffic among the mobile terminals in a communications coverage area, routing to other communication network sites, and communication relays between terminals that are equipped. Radio network controller 440 and mobility management entity 446 also include the ability to provide information on mobile terminals in geographic locations that are available for network services and network services that may be available in a particular geographic region.

The authenticator 442 component monitors authentication processes of its corresponding component in the communication network, such as authentication center 214, during normal operations. The authentication and authorization processes may include, for example, without limitation, back-up keys and processes, encryption algorithms, and security policies. Authenticator 442 stores all relevant parameters during normal operations of the base station.

Authenticator 442 may be activated into survivability mode by detector 438 in a network disruption. In survivability mode, authenticator 442 provides authentication and authorization processes for mobile terminals in a surviving area. A surviving area is a geographical or coverage area of the surviving base stations that are operating in survivability mode. In survivability mode, the back-up keys and processes will enable mobile terminals from different networks to be operated together and additionally enables the provision of additional emergency services to groups of terminals. In some embodiments, authenticator 442 may not be required as a base station may operate with minimal or no authentication and encryption of radio traffic. In these embodiments, mobile terminals may rely on their own individual encryptions and authentication for security.

The visitor location register and home location register 448 may also be activated by detector 438 in a disrupted network. Visitor location register and home location register 448 (HLR/VLR) and mobility management entity 446 (MME) duplicate the function of corresponding components, such as MME 210 and HLR/VLR 212 in mobile wireless communications network 200. Visitor location register and home location register 448 provide continued identification and service subscriptions of the terminals within the coverage area of a base station. The visitor location register and home location register 448 may be preconfigured or preloaded with information that enables authentication and management of the mobile terminals in survivability mode. The visitor location register and home location register 448 and mobility management entity 446 (MME) maintain a register of terminals in a base station's area to facilitate communication among terminals.

The visitor location register and home location register 448 may also contain information on the location of mobile terminals in the area of a base station that was previously recorded or cached from corresponding network components, such as MME 210 and HLR/VLR 212, previously operating in normal mode. The previously recorded and cached information enable the continued identification of mobile terminals within the communications networks, including mobile terminals that may be switched off or inactive at the time the network is disrupted.

In an embodiment, a number of base stations may be available. Visitor location register (VLR) and home location register (HLR) 448 exchange information with the available base stations and their VLR/HLR and MME components to enable existing terminals to be located within the surviving group of base stations. Visitor location register and home location register 448 may also translate phone numbers to forward to local terminals and services. For example, visitor location register and home location register 448 may translate emergency contact numbers to appropriate locally available facilities or provide appropriate message responses, such as out-of-service announcements and message exchanges.

Locator 450 provides location services to supplement the location capabilities of the mobile network which include, without limitation, processing services for mobile terminals that require processing by a network of location measurements, such as, without limitation, Global Positioning System satellite signals. Locator 450 may also provide additional transmissions and processing facilities to enable the transmissions from the base station to be used for location services processed by the mobile terminals or by the base station itself or in cooperation with other available or operating base stations. In the event that radio signals from location services are no longer available, the locator 450 may be equipped to provide replacement signals for some location services. This may include, for example, without limitation, supplemental land-based or terrestrial signals for the satellite location services or other completely land-based location techniques that may be recognized by one skilled in the art.

Storage server 452, during normal operations of base station 410, maintains a cache or storage of recent local communications traffic and information on applications that are being used throughout a network. Storage server 452 captures and updates this information, during normal operation, from its corresponding server components in the communications network, such as gateway serving node 208.

During a disruption or network outage, storage server 452 is activated by the operations controller 436 to function as a local server. The information in storage server 452 may be accessed using protocols and addresses similar to the protocols and addresses being used when the network was available. In addition, the storage server 452 may be pre-loaded with information that may be used in the local area of the base station to continue network operations. For example, storage server 452 may contain information or resources including, without limitation, maps, infrastructure plans, addresses, repair manuals, and other such information that may be useful during an emergency.

Communications controller 454 may be configured to provide visual aid or views to terminals during a network disruption. The communications controller 454 may additionally initiate specialized services such as broadcast information voice and data channels that enable terminals within the network to communicate. For example, communications controller 454 may facilitate the formation and operation of groups of terminals in sharing information, voice communications, and other services.

Communications controller 454 may also designate radio channels for peer-to-peer communications for terminals capable of establishing such links. In the peer-to-peer mode, a base station may provide through a radio network controller 440 and a Visitor location register and home location register 448, suitable identification and addressing codes for terminals to identify each other and for allocation and supervision of peer-to-peer channels.

S-Radio controller 434 enables communication services to be continued and extended over areas in which base stations exist within a network after a disruption. S-Radio controller 434 may be used together with S-Radio link 432 by detector 438 to determine the extent of a disruption within a communications network. For example, the disruption may be a local communications or network failure of a single base station within a communications network or it may be a global failure affecting a plurality of base stations. Detector 438 may operate S-Radio controller 434 and S-Radio link 432 to determine the existence and operating status of other base stations in the network and whether the base stations are operating in a survivability mode or are not affected by any network or communications disruptions.

S-Radio controller 434 may also contain apparatus that facilitates the radio transmitters and receivers 420 to utilize the same radio channels as mobile terminals within the network to enable a base station to communicate with other base stations. The S-Radio controller 434 may also enable communication with other base stations or network nodes using the S-Radio link 432.

External network connections 460 interface with external network facilities and components. External network connections may be monitored by detector 438 to determine whether the network components are disrupted and whether the base station should enter survivability mode. Detector 438 also monitors the network to determine whether network communications are restored and enables the base station to be returned to normal operations and the operations of the survivability mode components 430 to be discontinued.

Figure 5:
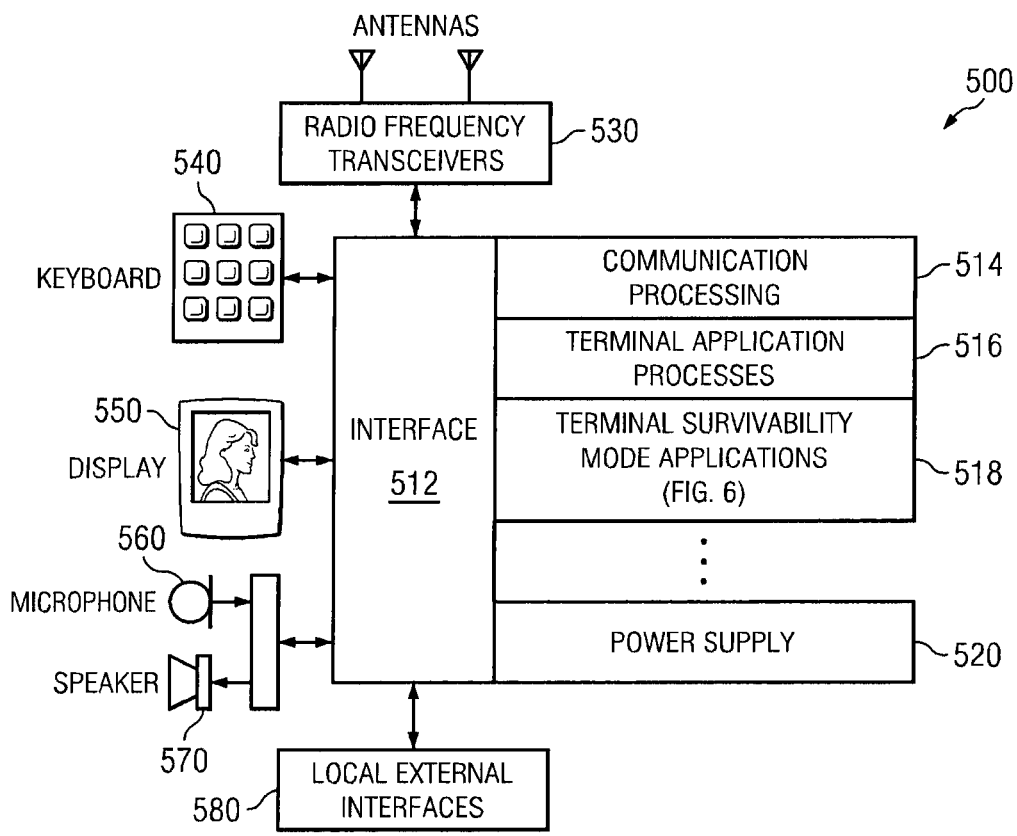
FIG. 5 illustrates a block diagram of a mobile terminal according to an illustrative embodiment of the disclosure.

Turning now to FIG. 5 a block diagram of mobile terminal 500 is illustrated according to an illustrative embodiment of the disclosure. Mobile terminal 500 may be equipped with terminal survivability mode applications 518 that may be activated during a services or communications disruption.

Mobile terminal 500 includes components that may be present in a mobile terminal 500, such as, without limitation, radio frequency transceivers 530, a display 550, microphone 560, speaker 570, keyboard 540, and an interface 512. Mobile terminal 500 may also include local external interfaces 580, communication processing 514, terminal application processes 516, and a power supply 520. Mobile terminal 500 may be preloaded with terminal survivability mode applications 518 to enable the mobile terminal 500 to activate a survivability or emergency mode during a disruption of communications.

For example, in an embodiment, the survivability mode applications 518 may be activated through a flag or other indicator received from a base station that indicates that communications services are disrupted or unavailable. In another embodiment, the terminal survivability mode applications 518 may be activated through communication of a parameter sent over a network, such as an access channel response message.

Figure 6:
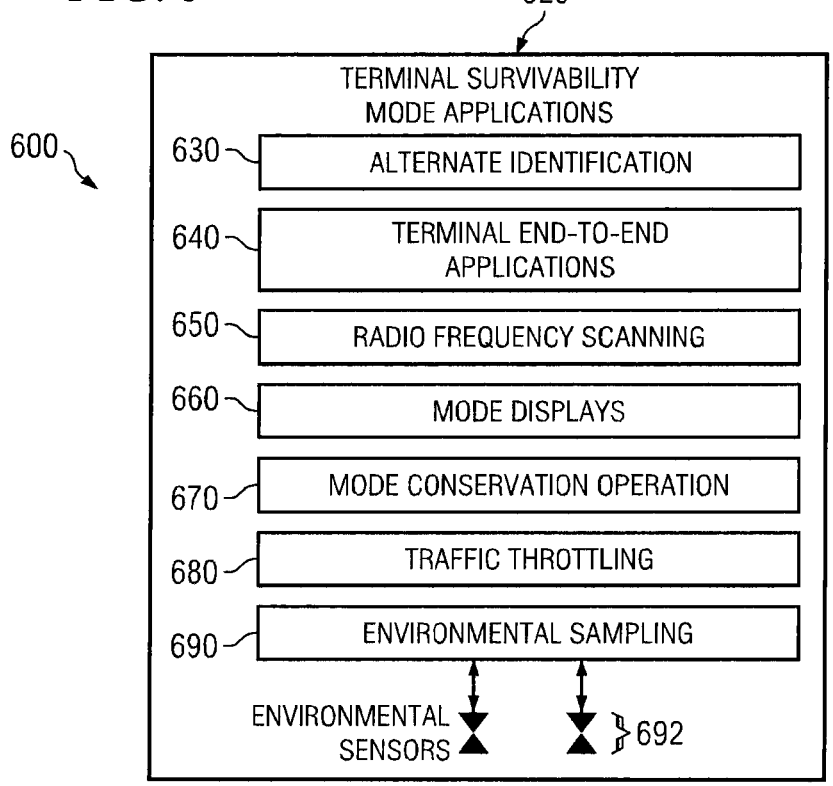
FIG. 6 illustrates a detail block diagram of the user equipment survivability mode applications according to an illustrative embodiment of the disclosure.

FIG. 6 illustrates detailed block diagram 600 of the survivability mode applications 620 that may exist as part of the survivability mode application, such as the terminal survivability mode applications 518 of FIG. 5.

Terminal survivability mode applications 620 may include a number of different applications such as, without limitation, alternate identification 630, terminal end-to-end applications 640, radio frequency scanning 650, mode displays 660, mode conservation operation 670, traffic throttling 680, environmental sampling 690, and environmental sensors 692.

The alternate identification 630 may interpret broadcast signaling from a base station and enable the survivability functions. Alternate identification 630 allows the mobile terminal to maintain an additional identity that may be authenticated by another mobile terminal or a base station within a communications network. The additional identity may include, without limitation, the terminal name, the terminal affiliation, for example, ambulance, federal emergency, management agency, and the terminal user function, such as medic, electrician, police, fire, or other such functions.

In terminal end-to-end applications 640, a number of mobile terminals may communicate with each other within a communications network or directly with each other. Terminal end-to-end applications 640 may enable the receiving and sending of information and packets among a plurality of mobile terminals. For example, three-way or multiple way communications may be enabled. Additionally, for example, text messages may be exchanged among devices or terminals within a coverage area during a disruption.

Radio frequency scanning 650 may enable the mobile terminal to scan its local area to determine the existence of surviving base stations. The information obtained through the scan may include, without limitation, the mode of operation of the base stations, for example, whether the base stations are operating in energy savings mode or on battery power. This information would then be communicated to a user to enable manual selection with the base station that is active. The information may also be communicated to operational base stations that are minimally disrupted or unaffected by the communications disruption, to assist in re-forming islands of coverage, channel assignments and routing of traffic.

Mode displays 660 will provide some displays to the terminal user to indicate the operating mode of a terminal. For example, in a conservations operation mode, a mobile terminal may be operated in a mode in which it conserves power for itself and also for a base station. For example, if a terminal is operated in a power saving mode, it may reduce the amount of signaling to a base station which would result in a conservation of power. In addition, the terminal may provide a display that provides information regarding the terminal, base station, or network being operated in survivability mode.

Traffic throttling 680 controls the amount of network traffic that may be used in a survival mode to prevent the surviving components in a network from becoming overloaded. Environmental sampling 690 enables environmental sensors 692 to sense environmental conditions or qualities, such as pressure, air temperature, weather conditions, air quality, or other similar environmental conditions that may be recognized by one skilled in the art. The information from these sensors may be sent to other terminals or survivability components in the surviving network and used to assist in the management and recovery from the disruptions.

Figure 7B:
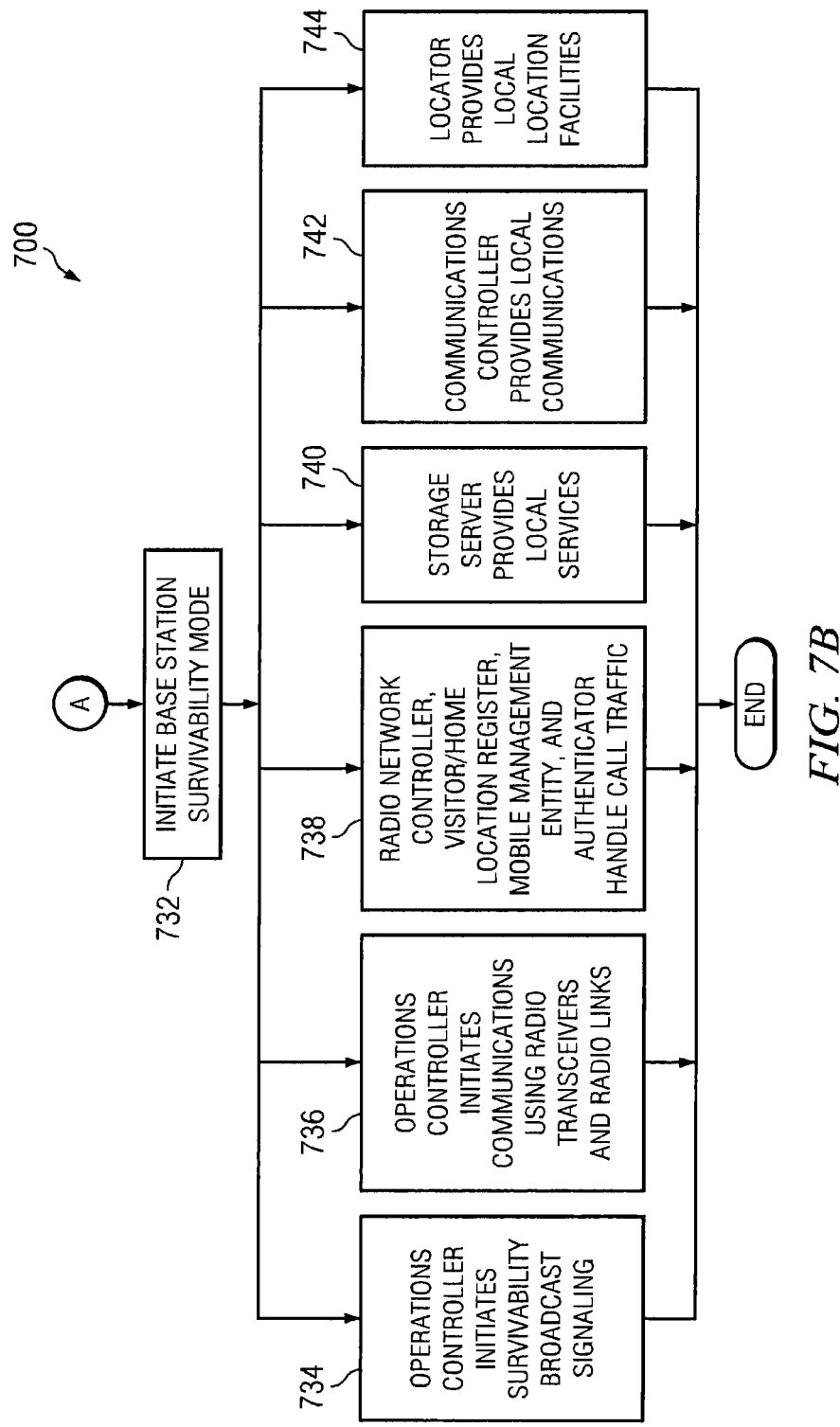
FIG. 7B illustrates a flowchart that represents the top level operations of a base station in a survivability mode according to an embodiment of the disclosure.

Turning now to FIG. 7 which comprises partial view FIG. 7A and FIG. 7B, flowchart 700 illustrates the top level operations of a base station operating in normal and a survivability mode according to an embodiment of the disclosure.

The operations begin in the monitoring wait state wherein the base station monitors base station communications at block 710. At block 720, it is determined whether a network disruption exists. A network disruption may include, without limitation, network services disruptions and communication disruptions. Survivability mode components within a base station may continue to shadow and record operations of corresponding components within a network in the absence of a communication network disruption.

The survivability mode component caches information on network communications and traffic at block 780 and continues to monitor base station communications at block 710 to detect the existence of a communications network disruption. The detection of a communications network disruption at block 720 results in the initiation of base station survivability mode operations at block 730. The activation of base station survivability mode operations at block 732 enables a number of operations to be activated to maintain communications within a network.

For example, at a block 734, the operations controller may initiate a broadcast signaling that indicates that a base station is in survivability mode. At a block 736, the operations controller may initiate communications using radio transceivers and radio links. At a block 738, call traffic may be handled by survivability mode components including, without limitation, radio network controller, visitor/home location register, mobility management entity, and the authenticator. At a block 740, storage server may provide information previously cached or stored regarding local services. At a block 742, communications controller may enable the establishment of communication links to provide local communications. At a block 744, locator may provide information that assists in locating mobile terminals in the area of the base station.

The survivability components continue to monitor the network to detect continuing disruptions at a block 750. At a block 760, it is determined whether normal operations of the network are restored. The restoration of the normal operations ends the survivability mode at a block 770. The survivability components may store or cache network information at a block 780 and return to shadow or monitor normal base station communications at block 710.

Figure 8B:
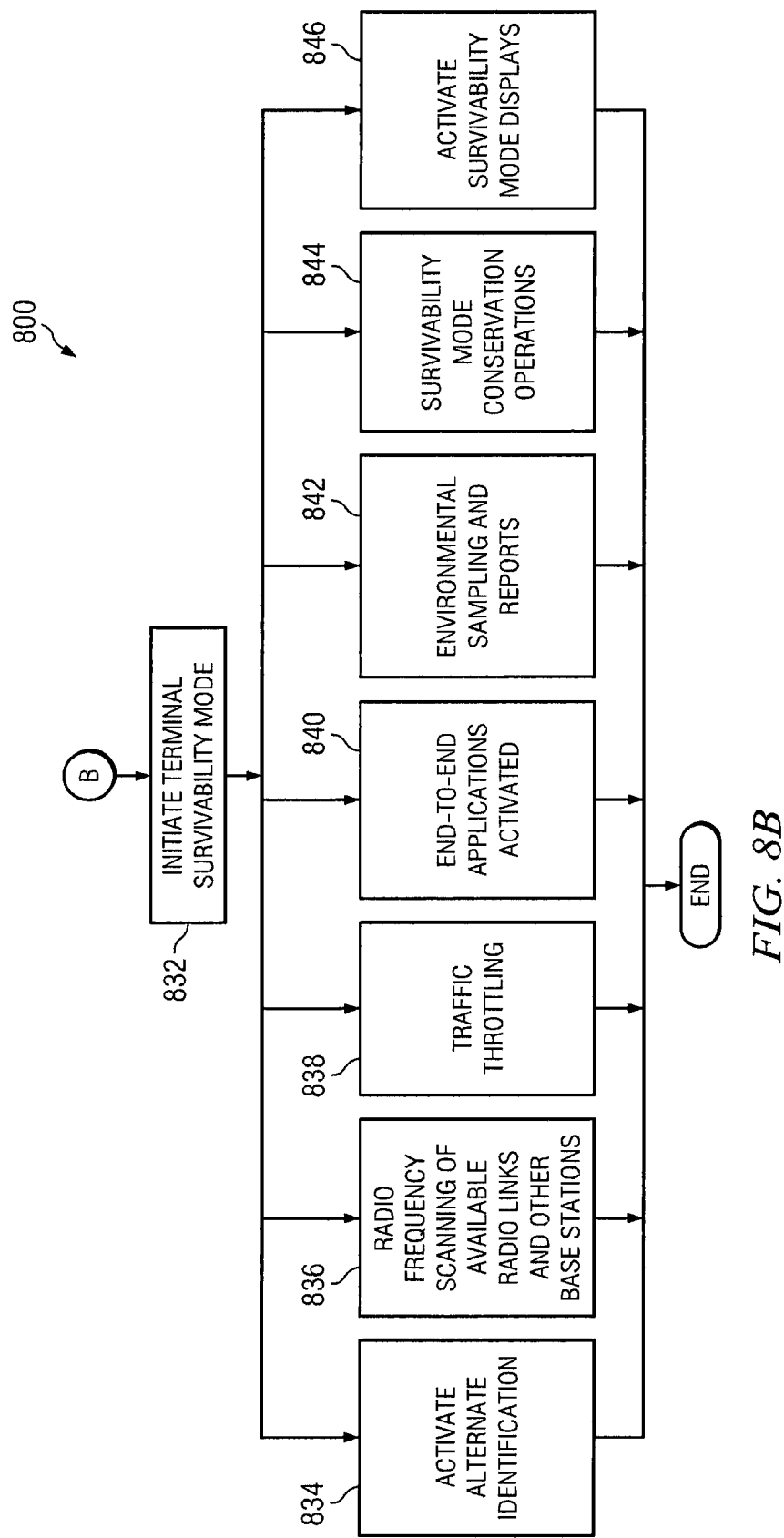
FIG. 8B illustrates a flowchart that represents the top level operations of a user equipment in survivability mode according to an embodiment of the disclosure.

Turning now to FIG. 8, which comprises partial view FIG. 8A and FIG. 8B, flowchart 800 illustrates top-level operations of a terminal in survivability mode according to an embodiment of the disclosure.

The operation begins by monitoring base station communications at a block 810. At a block 820, it is determined whether a network disruption exists. The terminal continues to monitor base station communication at a block 810 in the absence of any network disruptions or network failures. The existence of network disruptions at a block 820 results in the initiation of a survivability mode for a terminal at a block 830.

Terminal survivability mode is initiated at a block 832. The survivability mode includes, without limitation, the activation of alternate identification at a block 834 that enable the terminal to be identified by a base station. The survivability displays at block 846 may indicate that the terminal and the network are operating in survivability mode. The survivability mode may also include radio frequency scanning of available radio links and other base stations at block 836. The terminal activities may also include traffic throttling at block 838 which enable the terminal to reduce the rate at which the terminal communicates with a base station. Additional activities may include the activation of end-to-end application at a block 840, environmental sampling and reports 842.

The terminal survivability applications continue to monitor information received from base stations about continuing disruptions in the network at a block 850. At a block 860, it is determined whether normal operations of the network are restored. The restoration of the normal operations ends the terminal survivability mode at a block 870. In normal operation, the terminal survivability applications returns to the monitoring of base station communications at block 810.

Survivability mode conservation operations 844 may be initiated to save power and radio resources in the mobile terminal and in its interaction with the base station. Radio resources may include, without limitation, time, frequency and radio frequency (RF) power within a particular radio frequency spectrum.

Survivability mode conservation 844 operations may include, for example, longer sleep cycles, shortened broadcast signaling, and reduced radio access technology format types. In expanding coverage, mobile terminals in a survivability mode may support extended range operations through, for example, without limitation, additional power in radio frequency signal transmissions, lower transmission rates, higher coding formats, alternate antenna configurations, and smaller orthogonal frequency division multiplexing (OFDM) tile sizes or time division multiple access (TDMA) frames. This may also include operating the radio access technology with a reduced set of features. For example, instead of operating in a complex Universal Mobile Telecommunications System (UMTS) mode, the radio access technology may operate in a Global System for Mobile (GSM) communication mode.

The mobile terminal and the base station may also coordinate their transmissions to reduce interference between mobile network systems. Reducing interference between mobile network systems increases the range of the mobile terminals that are operating in survivability mode by limiting usage and reducing traffic within a communications network. The resources of the mobile terminal in survivability mode may also be conserved by enabling device-to-device communications among mobile terminals that are operational and capable of device-to-device communications and that are within signal range of another mobile terminal.

Figure 9:
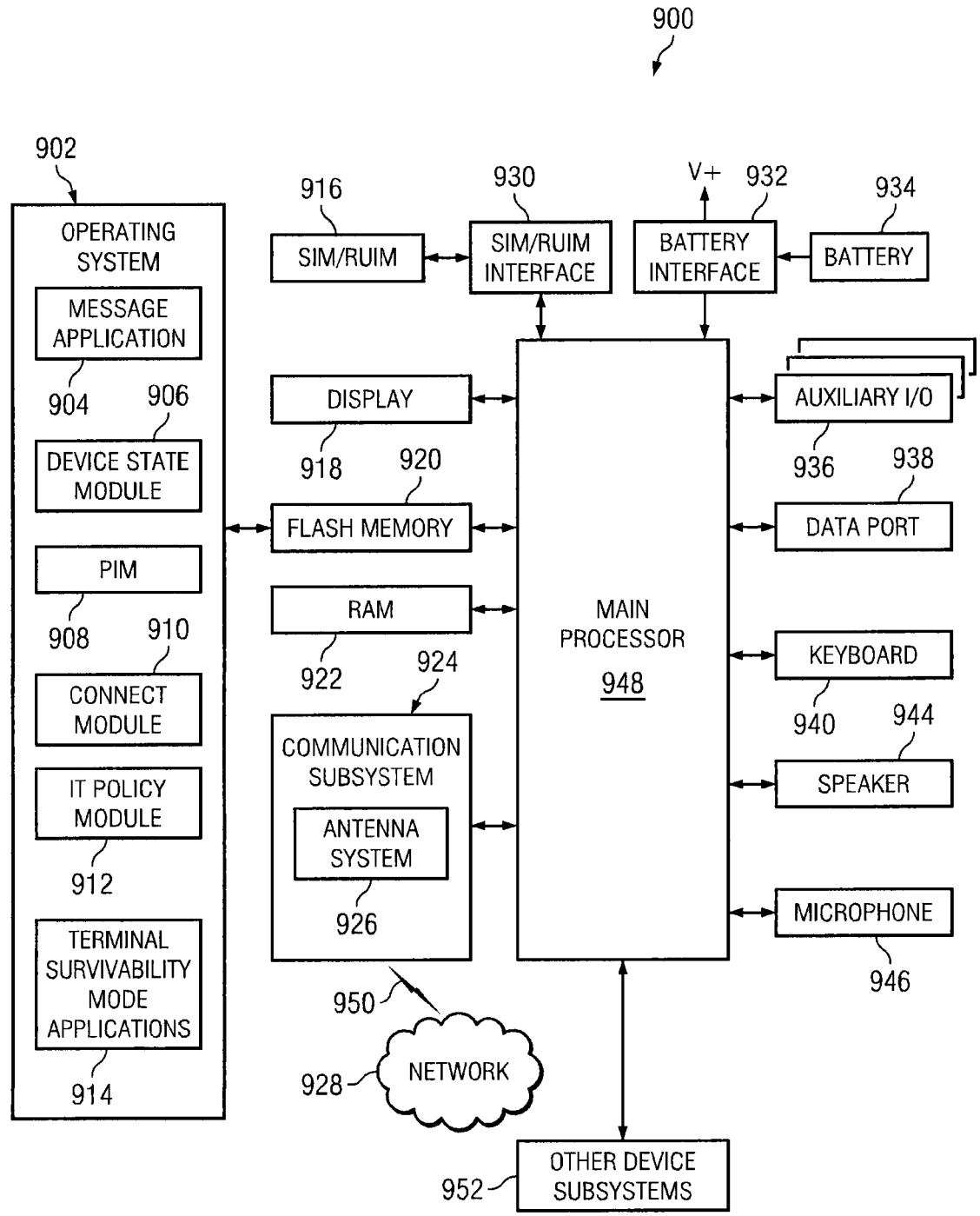
FIG. 9 is a block diagram of a mobile terminal in accordance with an illustrative embodiment of the disclosure.

Referring now to FIG. 9, a block diagram of a mobile terminal 900 is illustrated according to an illustrative embodiment of the disclosure. Mobile terminal 900 may be a mobile wireless communication device, such as a mobile cellular device, that may function as a smart terminal such as smart terminal 500 in FIG. 5. Mobile terminal 900 may be configured to implement features of the disclosure, such as the terminal survivability mode applications 518 as depicted in FIG. 5.

Examples of applicable communication devices include pagers, mobile cellular phones, cellular smart-phones, wireless organizers, personal digital assistants, computers, laptops, handheld wireless communication devices, wirelessly enabled notebook computers and such other communication devices.

Mobile terminal 900 includes communication elements in communication subsystem 924 that may be configured to perform radio frequency communications through antenna system 926. Antenna system 926 may include a plurality of antennas for simultaneous radio frequency signal transmission or reception.

The mobile terminal is a two-way communication device with advanced data communication capabilities including the capability to communicate with other mobile devices, computer systems, assistants through a network of transceivers. In FIG. 9, mobile terminal 900 includes a number of components similar to the components described in mobile terminal 500 of FIG. 5. The components include, for example, without limitation, main processor 948 that controls the overall operation of mobile terminal 900. Communication functions are performed through communication subsystem 924. Communication subsystem 924 receives messages from and sends messages across wireless link 950 to wireless network 928.

Communications subsystem 924 provides communication between the mobile device 900 and different systems or devices such as antenna system 926, without the use of the wireless network 928. For example, communications subsystem 924 may include an infrared device and associated circuits and components for short-range communication. Examples of short-range communication standards include standards developed by the Infrared Data Association (IrDA), Bluetooth, and the 802.1 1 family of standards developed by Institute of Electrical and Electronics Engineers (IEEE). Short range communications may include, for example, without limitation, radio frequency signals within a 2.4 GHz band or a 5.8 GHz band.

In this illustrative embodiment of the mobile terminal, the communication subsystem 924 is configured in accordance with the Global System for Mobile Communication (GSM) and General Packet Radio Services (GPRS) standards. The GSM/GPRS wireless network is used worldwide and it is expected that these standards will be superseded eventually by, for example, without limitation, Evolved Enhanced Data GSM Environment (EEDGE) and Universal Mobile Telecommunications Service (UMTS), High Speed Packet Access (HSPA), Long Term Evolution (LTE), and other standards applicable to multiple input multiple output technology. New standards are still being defined, but it is believed that they will have similarities to the network behavior described herein, and it will also be understood by persons skilled in the art that the embodiments described herein are intended to use any other suitable standards that are developed in the future.

The wireless link 950 connecting the communication subsystem 924 with wireless network 928 represents one or more different radio frequency (RF) channels, operating according to defined protocols specified for GSM/GPRS communications. With newer network protocols, these channels are capable of supporting both circuit switched voice communications and packet switched data communications.

Although the wireless network 928 associated with mobile terminal 900 may be a GSM/GPRS/EDGE wireless network in one illustrative implementation, other wireless networks may also be associated with the mobile terminal 900 in variant implementations. Examples of these networks include, but are not limited to, Code Division Multiple Access (CDMA) or CDMA2000 networks, GSM/GPRS/EDGE networks (as mentioned above), third-generation (3G) networks such as UMTS, HSPA, and also future fourth-generation (4G) networks such as such as LTE and Worldwide Interoperability for Microwave Access (Wi-Max). Main processor 948 also interacts with additional subsystems such as Random Access Memory (RAM) 922, a flash memory 920, a display 918, an auxiliary input/output (I/O) 936 subsystem, a data port 938, a keyboard 940, a speaker 944, a microphone 946, and other device subsystems 952.

Some of the subsystems of the mobile terminal 900 perform communication-related functions, whereas other subsystems may provide "resident" or on-device functions. By way of example, the display 918 and the keyboard 940 may be used to provide both communication-related functions, such as entering a text message for transmission over the network 928, and device-resident functions such as a calculator and/or task list.

The mobile terminal 900 can send and receive communication signals over the wireless network 928 after required network registration or activation procedures have been completed. Network access is associated with a subscriber or user of the mobile terminal 900. To identify a subscriber, the mobile terminal 900 requires a Subscriber Identity Module or a Removable User Identity Module, SIM/RUIM module 916, to be inserted into a SIM/RUIM interface 930 in order to communicate with a network. The SIM/RUIM module 916 is one type of a conventional "smart card" that can be used to identify a subscriber of the mobile terminal 900 and to personalize the mobile terminal 900, among other things. Without the SIM/RUIM module 916, the mobile terminal 900 is not fully operational to communicate with the wireless network 928.

By inserting the SIM/RUIM module 916 into the SIM/RUIM interface 930, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM module 916 includes a processor and memory to store information. Once the SIM/RUIM module 916 is inserted into the SIM/RUIM interface 930, it is coupled to main processor 948. In order to identify the subscriber, the SIM/RUIM module 916 can include some user parameters such as an International Mobile Subscriber Identity (IMSI).

A feature of using the SIM/RUIM module 916 is that a subscriber is not necessarily bound by any single physical mobile terminal. The SIM/RUIM module 916 may store additional subscriber information for a mobile terminal as well, including various personal information such as, for example a datebook or calendar information and recent call information. Alternatively, user identification information can also be programmed into the flash memory 920.

The mobile terminal 900 is a battery-powered device and includes a battery interface 932 to receive one or more rechargeable batteries 934. In at least some embodiments, the battery 934 can be a smart battery with an embedded microprocessor. The battery interface 932 is coupled to a regulator (not shown), which assists the battery 934 in providing power V+ to the mobile terminal 900. Although current technology makes use of a battery, future technologies such as micro fuel cells may provide the power to the mobile terminal 900.

The mobile terminal 900 also includes an operating system 902 and software components 904 to 914 which are described in more detail below. The operating system 902 and the software components 904 to 914 that are executed by main processor 948 are typically stored in a persistent store such as the flash memory 920, which may alternatively be a read-only memory (ROM) or similar storage element (not shown). Those skilled in the art will appreciate that portions of the operating system 948 and the software components 904 to 914 such as specific device applications, or parts thereof, may be temporarily loaded into a volatile store such as the RAM 922. Other software components can also be included, as is well known to those skilled in the art.

The subset of software applications 952 that control basic device operations, including data, voice communication applications, antenna system 926, and communication subsystem 924 applications will normally be installed on the mobile terminal 900 during its manufacture. Other software applications include a message application 904 that can be any suitable software program that allows a user of the mobile terminal 900 to send and receive electronic messages.

Various alternatives exist for the message application 904 as is well known to those skilled in the art. Messages that have been sent or received by the user are typically stored in the flash memory 920 of the mobile terminal 900 or some other suitable storage element in the mobile terminal 900. In at least some embodiments, some of the sent and received messages may be stored remotely from the device 900 such as in a data store of an associated host system with which the mobile terminal 900 communicates.

The software applications can further include a device state module 906, a Personal Information Manager (PIM) 908 and other suitable modules (not shown). The device state module 906 provides persistence which means that the device state module 906 ensures that important device data is stored in persistent memory, such as the flash memory 920, so that the data is not lost when the mobile terminal 900 is turned off or loses power. The PIM 908 includes functionality to organize and manage data items of interest to the user, such as, but not limited to, e-mail, contacts, calendar events, voice mails, appointments, and task items. A PIM application has the ability to send and receive data items via the wireless network 928. PIM data items may be seamlessly integrated, synchronized, and updated via the wireless network 928 with the mobile terminal subscriber's corresponding data items stored or associated with a host computer system. This functionality creates a mirrored host computer on the mobile terminal 900 with respect to such items, which may be applicable when the host computer system is the mobile terminal subscriber's office computer system.

The mobile terminal 900 also includes a connect module 910, and an information technology (IT) policy module 912. The connect module 910 implements the communication protocols that are required for the mobile terminal 900 to communicate with the wireless infrastructure and any host system, such as an enterprise system, with which the mobile terminal 900 is authorized to interface.

The connect module 910 includes a set of application programming interfaces (APIs) that can be integrated with the mobile terminal 900 to allow the mobile terminal 900 to use any number of services associated with the enterprise system. The connect module 910 allows the mobile terminal 900 to establish an end-to-end secure, authenticated communication pipe with the host system. A subset of applications for which access is provided by the connect module 910 can be used to pass IT policy commands from the host system to the mobile terminal 900. This can be done in a wireless or wired manner. These instructions can then be passed to the IT policy module 912 to modify the configuration of the device 900. Alternatively, in some cases, the IT policy update can also be done over a wired connection.

The IT policy module 912 receives IT policy data that encodes the IT policy. The IT policy module 912 then ensures that the IT policy data is authenticated by the mobile terminal 900. The IT policy data can then be stored in the flash memory 920 in its native form. After the IT policy data is stored, a global notification can be sent by the IT policy module 912 to all of the applications residing on the mobile terminal 900. Applications for which the IT policy may be applicable then respond by reading the IT policy data to look for IT policy rules that are applicable.

The Terminal Survivability Application module 914 monitors the network communications through the communications subsystem 926 and initiates and terminates the terminal survivability mode and the functions of the survivability components such as those described with reference to FIG. 7 and FIG. 8.

Other types of software applications can also be installed on the mobile terminal 900. These software applications can be third party applications, which are added after the manufacture of the mobile terminal 900. Examples of third party applications include games, calculators, utilities, and other similar applications know to one skilled in the art.

The additional applications can be loaded onto the mobile terminal 900 through the wireless network 928, the auxiliary I/O 936 subsystem, the data port 938, the communication subsystem 924, or any other suitable device subsystem 952. This flexibility in application installation increases the functionality of the mobile terminal 900 and may provide enhanced on-device functions, communication-related functions, or both. For example, secure communication applications may enable electronic commerce functions and other such financial transactions to be performed using the mobile terminal 900.

The data port 938 enables a subscriber to set preferences through an external device or software application and extends the capabilities of the mobile terminal 900 by providing information or software downloads to the mobile terminal 900 other than through a wireless communication network. The alternate download path may, for example, be used to load an encryption key onto the mobile terminal 900 through a direct and thus reliable and trusted connection to provide secure device communication.

The data port 938 may be any suitable port that enables data communication between the mobile terminal 900 and another computing device. The data port 938 may be a serial or a parallel port. In some instances, the data port 938 may be a USB port that includes data lines for data transfer and a supply line that can provide a charging current to charge the battery 934 of the mobile terminal 900.

In operation, a received signal such as a text message, an e-mail message, or web page download will be processed by the communication subsystem 924 and input to main processor 948. Main processor 948 will then process the received signal for output to the display 918 or alternatively to the auxiliary I/O subsystem 936. A subscriber may also compose data items, such as e-mail messages, for example, using the keyboard 940 in conjunction with the display 918 and possibly the auxiliary I/O subsystem 936.

The auxiliary I/O subsystem 936 may include devices such as: a touch screen, mouse, track ball, infrared fingerprint detector, or a roller wheel with dynamic button pressing capability. The keyboard 940 is preferably an alphanumeric keyboard together with or without a telephone-type keypad. However, other types of keyboards may also be used. A composed data item may be transmitted over the wireless network 928 through the communication subsystem 924.

With respect to voice communications, the overall operation of the mobile terminal 900 is substantially similar, except that the received signals are output to the speaker 944, and signals for transmission are generated by the microphone 946. Alternative voice or audio I/O subsystems, such as a voice message recording subsystem, can also be implemented on the mobile terminal 900. Although voice or audio signal output is accomplished primarily through the speaker 944, the display 918 can also be used to provide additional information such as the identity of a calling party, duration of a voice call, or other voice call related information.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. The embodiment or embodiments selected are chosen and described in order to best explain the principles of the embodiments, the practical application, and to enable others of ordinary skill in the art to understand the disclosure of various embodiments with various modifications as are suited to the particular use contemplated. For example, the various elements or components may be combined or integrated in another system or certain features may be omitted or not implemented.

The processes disclosed herein may be implemented by a computer implemented process in which a different illustrated action may take the form of program code embodied on a computer recordable storage medium or device for execution by a controller or processor unit such as a communications processor 514. The recordable storage medium or device may be, for example, semiconductor memory, EPROM, a hard disk drive, a flash drive, a solid state disk drive, a floppy disk, a CD-ROM, DVD-ROM, or some other mechanical storage device. The substantive programs that control basic device operations, including data and voice communication applications, will normally be installed on a mobile terminal during manufacture, but may also be installed or updated after deployment.

Also, techniques, systems, and subsystems, described and illustrated in the various embodiments as discreet or separate may be combined or integrated with other systems, modules, or techniques without departing from the scope of the present disclosure. Other items shown or discussed as coupled or directly coupled or in communication with each other may be indirectly coupled or communicated through some other interface, device, or intermediate component whether electrically, mechanically, or otherwise. Other examples of changes, substitution, and alterations are ascertainable by one skilled in the art and could be made without departing from the spirit and scope disclosed herein.

The invention claimed is:

1. A mobile terminal comprising:
    one or more survivability components configured to:
        monitor communications within a communications network;
        cache network communications and traffic information before a network failure occurs, wherein the one or more survivability components store the cached network communications and traffic information in at least one storage device within the mobile terminal; and
        upon a network failure, perform a same function as one or more components within the communications network using the cached network communications and traffic information,
        wherein the one or more survivability components are configured to activate a survivability mode upon detecting a disruption of communication within the communications network, wherein activating the survivability mode causes the mobile terminal to consume less power and radio resources than consumed when the survivability mode is inactive.

2. The mobile terminal of claim 1, wherein the one or more survivability components include a detector configured to determine an existence of a communications disruption within the communications network.

3. The mobile terminal of claim 2, wherein the survivability components include an operations controller configured to manage operations with a base station manager component in at least one base station in the communications network.

4. The mobile terminal of claim 2, wherein the survivability components include a mobility and location controller comprising a mobility management entity (MME) and a visitor location register and home location register (VLR/HLR), wherein the MME and VLR/HLR enable the mobile terminal to identify locations of mobile terminals within a coverage area of a base station.

5. The mobile terminal of claim 2, wherein the survivability components include an authenticator, and wherein the mobile terminal is configured to utilize the authenticator to provide authentication and authorization processes to mobile terminals in a surviving area.

6. The mobile terminal of claim 1, wherein the one or more survivability components include an S-Radio link configured to establish a communications link between base stations within the communications network.

7. The mobile terminal of claim 1, wherein the one or more survivability components are configured to receive local information and resources from a storage server during an emergency.

8. A base station of a communications network, the base station comprising:
    one or more survivability components configured to:
        monitor communications within the communications network;
        cache network communications and traffic information within a storage server located on the base station before a network failure occurs;
        upon a network failure, perform a same function as one or more components within the communications network using the cached network communications and traffic information; and
        activate a survivability mode upon detecting a disruption of communication within the communications network, wherein activating the survivability mode causes the base station to consume less power and radio resources than consumed when the survivability mode is inactive.

9. The base station of claim 8, wherein the one or more survivability components comprise a detector configured to determine the existence of the network failure.

10. The base station of claim 9, wherein the detector is further configured to activate operations of the one or more survivability components at the base station.

11. The base station of claim 8, wherein each survivability component is configured to monitor its corresponding component within the communications network and cache information and activity of the corresponding component.

12. The base station of claim 8, wherein the one or more survivability components are preloaded with information that enables the base station to authenticate and manage mobile terminals operating in the survivability mode during the network failure.

13. The base station of claim 12, wherein the storage server is preloaded with information.

14. The base station of claim 8, wherein the one or more survivability components perform, during the network failure, at least one function that would otherwise be performed by a mobility management entity (MME), a visitor location register (VLR) and/or a home location register (HLR).

15. The base station of claim 8, wherein the one or more survivability components comprise an S-Radio link configured to enable communication traffic between operational base stations.

16. A method of operating a base station, the method comprising:
    monitoring communications within a communications network;
    caching network communications and traffic information within a storage server located on the base station before a network failure occurs;
    upon a network failure, performing, by the base station, a same function as one or more components within the communications network using the cached network communications and traffic information; and activating a survivability mode upon detecting a disruption of communication within the communications network, wherein activating the survivability mode causes the base station to consume less power and radio resources than consumed when the survivability mode is inactive.

17. The method of claim 16, further comprising activating operations of survivability components in a number of base stations in the communication network in response to detecting the network failure, wherein activating operations of the survivability components cause the base stations to perform functions that would otherwise be performed by a mobility management entity (MME), a visitor location register (VLR) and/or a home location register (HLR).

18. The method of claim 16, further comprising using an S-Radio link to enable communication between operational base stations during the network failure.

\* \* \* \* \*